United States Patent [19]

Corrigan

[11] Patent Number: 4,882,189
[45] Date of Patent: Nov. 21, 1989

[54] METHOD OF SPRAYING WATER MIST ONTO PRODUCE IN A DISPLAY CASE

[75] Inventor: John E. Corrigan, Glenview, Ill.

[73] Assignee: Carrot Top Inc., Northbrook, Ill.

[21] Appl. No.: 217,317

[22] Filed: Jul. 11, 1988

[51] Int. Cl.⁴ .............................................. A23L 1/212
[52] U.S. Cl. ..................................... 426/506; 99/516; 312/115
[58] Field of Search ................... 426/506, 507; 99/516; 312/115

[56] References Cited

U.S. PATENT DOCUMENTS 924,500  6/1909  Rush ..................................... 312/115
2,142,091  1/1939  Bird ..................................... 426/506

Primary Examiner—George Yeung
Attorney, Agent, or Firm—Wood, Dalton, Phillips, Mason & Rowe

[57] ABSTRACT

A method and apparatus for providing aqueous spray mist onto produce and the like provided in an upwardly opening case space. Water delivery to the nozzles is provided by an upwardly extending supply pipe within the case, eliminating the need for overhead mounting structure. The spray pattern and timed delivery are coordinated to assure proper misting of the produce with minimum adverse effect on customers selecting produce from the case.

13 Claims, 1 Drawing Sheet

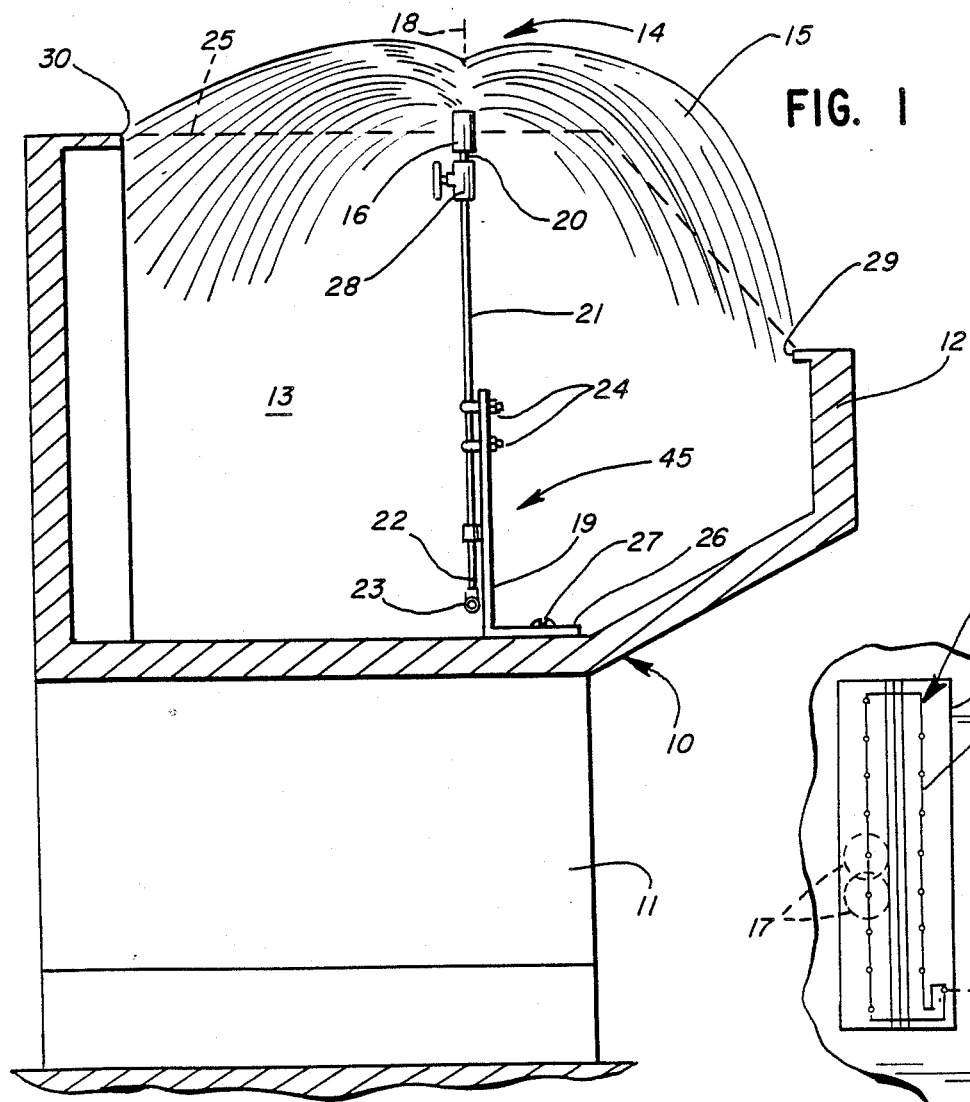
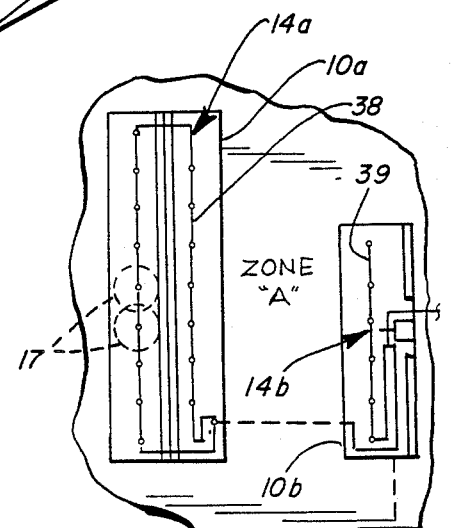
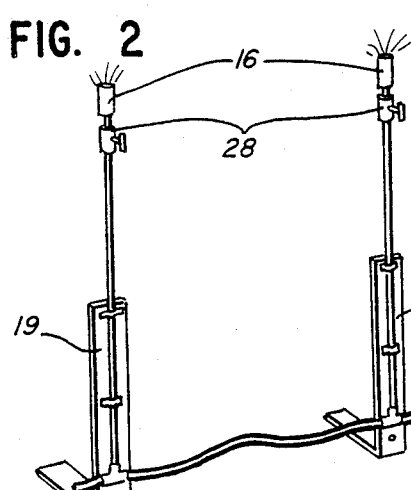
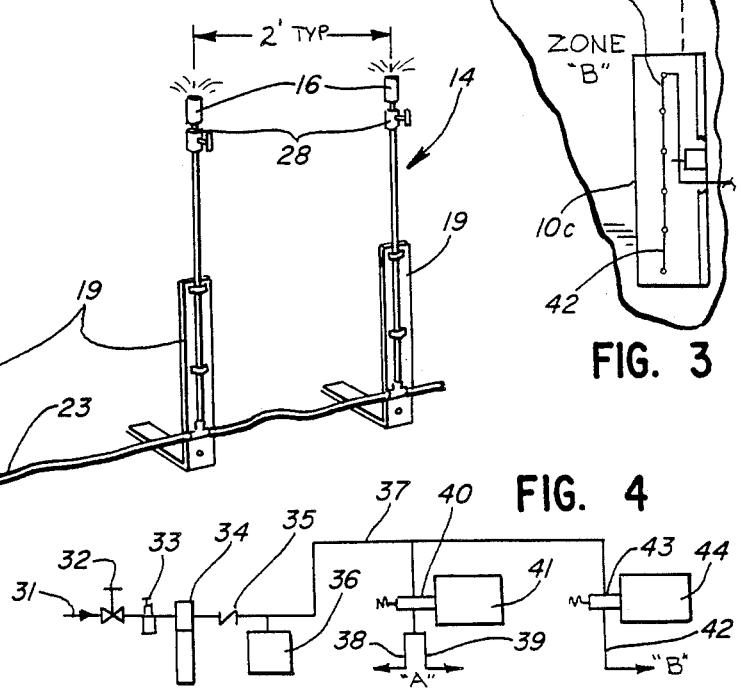

METHOD OF SPRAYING WATER MIST ONTO PRODUCE IN A DISPLAY CASE

TECHNICAL FIELD

This invention relates to misting spray systems wherein a fine water mist is delivered onto produce and the like carried by a produce case.

BACKGROUND ART

In one conventional form of produce misting spray system, a spray head is mounted in a superjacent relationship to produce to be sprayed with water mist therefrom. It is conventional to provide a cabinet having a forwardly cantilevered upper portion to which the spray head is mounted. Water lines are brought up in the cabinet and connected to the spray head for controlled distribution of mist therefrom onto the subjacent produce.

It has become increasingly common to provide such produce cases, such as in central locations, where the use of an upright rear wall to carry the water lines and forwardly cantilevered upper wall is counterindicated.

DISCLOSURE OF INVENTION

The present invention comprehends an improved misting system for spraying water mist onto produce and the like in an upwardly opening space of a produce cabinet.

The misting system of the present invention includes a spray nozzle defining a spray centerline and having means for spraying water therefrom in a fine mist at a wide angle to the centerline, and mounting means for vertically adjustably positioning the nozzle, with the centerline extending substantially vertically upwardly to discharge the mist from a location upwardly adjacent the top surface of produce placed in the space, and regulating means for adjusting the pressure of water in the system for adjusting the horizontal extent of the discharge to correspond to a horizontal extent of the space.

The invention further comprehends the provision of such an improved misting system wherein the regulating means comprises means for causing the discharge to define a misting pattern extending upwardly from the nozzle at the centerline to a substantial distance In the illustrated embodiment, the pressure is regulated to cause upward delivery of the mist to a distance of approximately 9" above the nozzle.

The invention comprehends the provision of such regulating means for causing the mist to be distributed horizontally outwardly from the centerline to a greater distance and, in the illustrated embodiment, the regulating means is adjusted to cause a horizontal outward delivery of the mist to approximately 18" to 24" from the centerline.

Means are further provided adjacent the nozzle for selectively preventing flow of water to the nozzle so that selected ones of a plurality of such nozzles may be utilized as desired.

The invention comprehends the method of providing mist onto produce provided in the display case, including the steps of providing an upwardly directed misting spray nozzle at a preselected portion of the case, connecting the spray nozzle to a source of pressurized water, causing the spray nozzle to provide water mist onto produce in the case in an expanding and contracting spray pattern extending upwardly from the nozzle to a preselected maximum vertical distance thereabove and laterally from the nozzle to a preselected maximum horizontal distance therefrom at least approximately twice the vertical distance.

In the illustrated embodiment, the vertical distance is approximately 9" and the horizontal distance is in the range of approximately 18" to 24".

The invention comprehends that the spray pattern be caused to be maintained at such vertical and horizontal distances for a preselected period of time greater than the period of time of expansion of the spray pattern thereto or contraction of the spray pattern therefrom.

In the illustrated embodiment, the spray pattern is caused to be horizontally circular.

The step of causing the spray nozzle to provide the mist in the spray pattern, in the illustrated embodiment, comprises a step of adjusting the pressure of the pressurized water delivered to the nozzle.

The step of providing the nozzle comprises a step of vertically adjusting the disposition of the nozzle relative to the case.

In the illustrated embodiment, the case defines a midportion, and the step of providing the nozzle comprises a step of positioning the nozzle at the midportion of the case.

The invention comprehends providing a plurality of such upwardly directed misting spray nozzles at preselected horizontally spaced locations at the top of the case. The spray patterns of the mist produced by the adjacent nozzles are caused to overlap.

In the illustrated embodiment, the case defines a midportion and the plurality of nozzles are spaced along the midportion.

The step of providing the nozzles comprises a step of vertically adjusting the disposition of the respective nozzles relative to the case.

The apparatus and method are extremely simple and economical while yet providing the highly desirable feature of permitting improved misting of produce in cases located in spaced relationship to building walls.

BRIEF DESCRIPTION OF THE DRAWING

Other features and advantages of the invention will be apparent from the following description taken in connection with the accompanying drawing wherein:

FIG. 1 is a side elevation of a produce case with the upper portion thereof shown in vertical section illustrating the mounting of a misting system nozzle embodying the invention therein;

FIG. 2 is a fragmentary perspective view illustrating the mounting of a plurality of such misting spray nozzles on a frame mounted in the case;

FIG. 3 is a fragmentary plan view illustrating the arrangement of a plurality of such produce cases in a floor area; and FIG. 4 is a schematic fluid flow diagram illustrating the water supply of the misting system.

BEST MODE FOR CARRYING OUT THE INVENTION

In the illustrative embodiment of the invention as disclosed in the drawing, a produce case generally designated 10 is provided with a base 11 and upstanding sidewalls 12 defining an upwardly opening produce space 13.

The invention comprehends providing for use with such a produce case a misting system generally designated 14 adapted to provide a fine mist 15 downwardly into the space 13 from a plurality of nozzles 16. The nozzles are arranged to provide the mist 15 in a horizontally circular pattern 17 and adjacent nozzles are arranged to cause overlapping of the patterns, as illustrated in FIG. 3.

The mist is sprayed upwardly and outwardly about the centerlines 18 of the respective nozzles at relatively wide angle, as seen in FIG. 1.

The invention comprehends the provision of means for vertically adjustably positioning the respective nozzles and, in the illustrated embodiment, the positioning means includes a plurality of brackets 19 associated one each with the respective nozzles 16. The nozzles are mounted to the upper end 20 of a vertical pipe 21 having a lower end 22 connected to a horizontally extending supply line 23. Brackets 19 are provided with adjustable clamps 24 for embracing and adjustably retaining the vertical pipe 21 to dispose the nozzles 16 at a desired level adjacent the upper level 25 of the produce space 13. Supply line 23 is preferably formed of a yieldable material, such as synthetic resin, so as to permit independent adjustment of the vertical position of the respective pipes 21 for selectively positioning the nozzles 16, as desired. As shown, bracket 19 may comprise a L-bracket having its lower leg 26 secured to the case 10 by suitable means, such as screws 27.

The invention further comprehends the provision of means for adjusting the horizontal extent of the discharge spray 15 to correspond to the horizontal extent of the space 13 at upper level 25. In the illustrated embodiment, the spray adjusting means comprises a manually adjustable pressure regulating shutoff valve 28 permitting the user to adjust the spray pattern 17 suitably to cover the desired area. As shown in FIG. 1, the pressure may be adjusted to cause the spray pattern to extend fully between the front end 29 and the rear end 30 of the space 13. In the illustrated embodiment, the misting spray pattern extends upwardly from the nozzle approximately 9" and horizontally outwardly from the centerline 18 approximately 18" to 24". Adjustment of the spray pattern, as indicated above, is effected by manual adjustment of the regulating valve 28. Valve 28 preferably comprises a valve adapted to be fully closed so as to further define shutoff means for permitting selective use of different ones of a plurality of the spray nozzles in the system.

The spray misting system of the present invention may be utilized with different case arrangements, such as illustrated in FIG. 3. As shown therein, the system may include a first spray system 14a in a first cabinet 10a, and a second spray system 14b in an adjacent second cabinet 10b. Further, a third misting system 14c may be provided in an associated third cabinet 10c. As shown in FIG. 3, cabinets 10a and 10b may be located in a first zone "A", and cabinet 10c may be located in a second, adjacent zone "B".

The spray nozzles may be connected to a conventional city water supply 31 through a gate valve 32, pressure regulator 33, filter 34, check valve 35, and accumulator 36.

The water is delivered to zones "A" and "B" through a supply line 37. Water is delivered from the supply line 37 to the distribution lines 38 and 39 of spray systems 14a and 14b, respectively, through a control valve 40 operated automatically by control panel 41. The control panel includes suitable timing means (not shown) for delivering the misting spray water to the nozzles 16 in a time delivery as desired. In the illustrated embodiment, the control panel is arranged to provide misting spray delivery for a short period of time and with a relatively long interval between successive spray deliveries. Illustratively, the spray may be delivered for a short period, such as four or five seconds, with the sprays being delivered approximately every four or five minutes.

Water is delivered to the spray system 14c through a distribution line 42 through a control valve 43, the operation of which is controlled by a control panel 44 having a timer for effecting timed delivery of the misting spray water, as desired. In the illustrated embodiment, the control 44 is adjusted to provide the timed delivery in substantially the same manner as does control 41.

Thus, the supply line 37 is provided with filtered misting spray water at a preselected regulated pressure. The control valves 40 and 43 effect a timed delivery of the supply water through the misting nozzles 16 under the further control of the pressure regulators 28 so as to provide the upwardly delivered spray pattern of FIG. 1, with the desired horizontal extension characteristics. The spray pattern is preferably, as indicated in FIG. 1, provided by a relatively wide spray pattern of nozzle 16, with the height of the spray pattern and horizontal extent thereof adjustably controlled by the respective valves 28. The spray system 14 of the present invention provides an improved time-controlled misting spray of produce and the like in the respective cases, with minimum adverse effect on customers selecting produce therefrom.

The short duration of the spray and the reduced pressure of the water causes an expansion of the spray pattern at the initiation of the misting operation so that produce immediately surrounding the centerline 18 receives a spray mist as the spray pattern builds up to the full pattern illustrated in FIG. 1. Similarly, when the misting operation is terminated, the spray pattern contracts, thus, again providing mist onto the produce inwardly of the full spray pattern shown in FIG. 1. The increase and decrease of the spray pattern in this manner assures a relatively uniform delivery of spray mist to all of the produce in the case.

Thus, the invention comprehends the improved method of providing mist onto produce or the like provided in a display case, or the like, including the steps of providing an upwardly directed misting spray nozzle at a preselected portion of the case, connecting the spray nozzle to a source of pressurized water, causing the spray nozzle to provide water mist onto material in the case in an expanding and contracting spray pattern extending upwardly from the nozzle to a preselected maximum vertical distance thereabove, and laterally from the nozzle to a preselected maximum horizontal distance therefrom at least approximately twice the vertical distance.

In the illustrated embodiment, the mist spray pattern is caused to be maintained at its maximum characteristics for a preselected period of time greater than the period of time of expansion and contraction of the spray pattern. In the illustrated embodiment, the spray pattern is caused to be horizontally circular.

The invention comprehends that the spray pattern be adjusted as desired by the user by controlling the pressure of the pressurized water delivered to the nozzle. The vertical height of the nozzle relative to the case may further be adjusted by suitable vertical positioning of the supply pipe 21, with the clamps 24 loosened to permit such adjustment.

In the illustrated embodiment, the cases define a midportion generally designated 45 and, as seen in FIG. 1, the spray nozzles may be positioned at said midportion.

As indicated above, the invention comprehends the provision of a plurality of such spray nozzles in preselected horizontally spaced relationship so as to provide overlapping of the spray patterns, as illustrated in FIG. 3.

As further indicated above, the control valves 28 preferably comprise regulating valve having a fully closed arrangement so as to permit selective prevention of delivery of the misting spray to one or more of the nozzles 16, as desired.

To permit facilitated vertical adjustment of the nozzles, the supply line 23 is preferably formed of a resilient material, such as synthetic resin, etc.

The improved misting spray means of the present invention is extremely simple and economical of construction while yet providing the desirable misting of produce and the like without the need for overhanging support structure. The disclosed apparatus provides an improved time-controlled, unobtrusive misting operation for maintaining produce and the like in fresh condition, with minimum adverse effect on customers selecting produce from the case.

The foregoing disclosure of specific embodiments is illustrative of the broad inventive concepts comprehended by the invention.

I claim:

1. The method of providing mist onto produce provided in a display case comprising the steps of:
    positioning an upwardly directed misting spray nozzle at a preselected portion of the case;
    intermittently connecting said spray nozzle to a source of pressurized water; and
    causing the spray nozzle to provide water mist onto produce in the case during a time when the spray nozzle is connected to the source of pressurized water in an expanding and contracting spray pattern extending upwardly from the nozzle to a preselected maximum vertical distance thereabove, and laterally from the nozzle to a preselected maximum horizontal distance therefrom at least approximately twice said vertical distance.

2. The method of providing mist onto product provided in a display case of claim 1 wherein said vertical distance is approximately 9".

3. The method of providing mist onto produce provided in a display case of claim 1 wherein said horizontal distance is in the range of approximately 18" to 24".

4. The method of providing mist onto produce provided in a display case of claim 1 wherein said mist spray pattern is caused to be maintained with said maximum vertical and horizontal distances for a preselected period of time greater than the period of time of expansion of the spray pattern thereto.

5. The method of providing mist onto produce provided in a display case of claim 1 wherein said mist spray pattern is caused to be maintained with said maximum vertical and horizontal distances for a preselected period of time greater than the period of time of contraction of the spray pattern thereto.

6. The method of providing mist onto produce provided in a display case of claim 1 wherein said mist spray pattern is caused to be maintained with said maximum vertical and horizontal distances for a preselected total period of time greater than the period of time of expansion and contraction of the spray pattern.

7. The method of providing mist onto produce provided in a display case of claim 1 wherein said spray pattern is caused to be horizontally circular.

8. The method of providing mist onto produce provided in a display case of claim 1 wherein said step of causing the spray nozzle to provide the mist in said spray pattern comprises a step of adjusting the pressure of pressurized water delivered to said nozzle.

9. The method of providing mist onto produce provided in a display case of claim 1 wherein said step of positioning said nozzle comprises a step of vertically adjusting the disposition of the nozzle relative to the case.

10. The method of providing mist onto produce provided in a display case of claim 1 wherein said case defines a midportion and said step of positioning said nozzle comprises a step of positioning said nozzle at said midportion.

11. The method of providing mist onto produce provided in an open display case comprising the steps of:
    positioning a plurality of upwardly directed misting spray nozzles at preselected horizontally spaced locations at the top of said case;
    intermittently connecting each said spray nozzle to a source of pressurized water; and
    causing each spray nozzle to provide water mist onto produce in the case during a time when the spray nozzle is connected to the source of pressurized water in an expanding and contracting spray pattern extending upwardly from the nozzle to a preselected maximum vertical distance thereabove, and laterally from the nozzle to a preselected maximum horizontal distance therefrom at least approximately twice said vertical distance, the spray patterns of the mist produced by adjacent nozzles overlapping.

12. The method of providing mist onto produce provided in a display case of claim 11 wherein said case defines a midportion and said plurality of nozzles are spaced along said midportion.

13. The method of providing mist onto produce provided in a display case of claim 11 wherein said step of positioning said nozzles comprises a step of vertically adjusting the disposition of each nozzle relative to the case.

* * * * *